United States Patent
Lee et al.

(10) Patent No.: US 8,546,007 B2
(45) Date of Patent: Oct. 1, 2013

(54) RECHARGEABLE BATTERY

(75) Inventors: Myung-Ro Lee, Yongin-si (KR); Myoung-Han Ryu, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 286 days.

(21) Appl. No.: 12/870,662

(22) Filed: Aug. 27, 2010

(65) Prior Publication Data

US 2011/0104540 A1    May 5, 2011

Related U.S. Application Data

(60) Provisional application No. 61/256,023, filed on Oct. 29, 2009.

(51) Int. Cl.
    *H01M 10/36*    (2010.01)
    *H01M 10/02*    (2006.01)
    *H01M 2/26*    (2006.01)

(52) U.S. Cl.
    USPC .............. 429/94; 429/153; 429/158; 429/159

(58) Field of Classification Search
    None
    See application file for complete search history.

(56) References Cited

U.S. PATENT DOCUMENTS

| | | | |
|---|---|---|---|
| 7,316,863 B2 | 1/2008 | Sato | |
| 7,642,005 B2 | 1/2010 | Han | |
| 8,088,509 B2 | 1/2012 | Shen et al. | |
| 8,114,537 B2 * | 2/2012 | Kang et al. | 429/96 |
| 8,129,049 B2 | 3/2012 | Kim et al. | |
| 2004/0197642 A1 | 10/2004 | Sato | |
| 2005/0084753 A1 | 4/2005 | Kim | |
| 2006/0024568 A1 * | 2/2006 | Lee | 429/130 |
| 2006/0110658 A1 | 5/2006 | Zhu et al. | |
| 2006/0269836 A1 | 11/2006 | Yamamoto et al. | |
| 2007/0231701 A1 | 10/2007 | Lee | 429/246 |

(Continued)

FOREIGN PATENT DOCUMENTS

| | | |
|---|---|---|
| CN | 1728434 A | 2/2006 |
| CN | 101257130 A | 9/2008 |

(Continued)

OTHER PUBLICATIONS

European Search Report, dated Nov. 29, 2010 for EP Application No. 10251581.4.

(Continued)

*Primary Examiner* — John S Maples
(74) *Attorney, Agent, or Firm* — Knobbe, Martens, Olson & Bear LLP

(57) ABSTRACT

A rechargeable battery is disclosed. In one embodiment, the battery includes i) a current collecting plate, ii) a plurality of electrode assemblies electrically connected in parallel with each other via the current collecting plate, wherein each of the electrode assemblies comprises two opposing ends and an outer side formed between the two ends, and wherein the current collecting plate is electrically connected to one of the two ends of the electrode assemblies. The battery may further includes 1) a spacer and 2) a can configured to accommodate i) the current collecting plate, ii) the plurality of electrode assemblies and iii) the spacer, wherein the spacer is positioned i) between adjacent electrode assemblies and/or ii) between an inner surface of the can and at least one of the electrode assemblies, and wherein the spacer comprises at least one non-linear portion which contacts the outer side of at least one of the electrode assemblies.

18 Claims, 9 Drawing Sheets

(56) References Cited

U.S. PATENT DOCUMENTS

| | | |
|---|---|---|
| 2008/0107962 A1 | 5/2008 | Uh |
| 2008/0206628 A1 | 8/2008 | Honbou |
| 2008/0286640 A1 | 11/2008 | Naito |
| 2009/0061294 A1 | 3/2009 | Ahn |
| 2009/0297946 A1 | 12/2009 | Yue et al. |
| 2009/0317713 A1 | 12/2009 | Kim et al. |
| 2009/0317714 A1 | 12/2009 | Maeng et al. |
| 2010/0015511 A1 | 1/2010 | Yoo et al. |
| 2010/0035144 A1 | 2/2010 | Oh et al. |
| 2010/0209749 A1 | 8/2010 | Okada |
| 2010/0266891 A1 | 10/2010 | Kwon et al. |
| 2011/0104958 A1 | 5/2011 | Kwon et al. |
| 2011/0165444 A1 | 7/2011 | Guo et al. |

FOREIGN PATENT DOCUMENTS

| | | |
|---|---|---|
| CN | 101308919 A | 11/2008 |
| EP | 2 031 674 A1 | 3/2009 |
| EP | 2 093 820 A1 | 8/2009 |
| JP | 2000-100401 A | 4/2000 |
| JP | 2000-285871 | 10/2000 |
| JP | 2001-185225 | 7/2001 |
| JP | 2004-311165 A | 11/2004 |
| JP | 2005-317456 A | 11/2005 |
| JP | 2006-040899 A | 2/2006 |
| JP | 2008-135374 A | 6/2008 |
| JP | 2008-210729 | 9/2008 |
| JP | 2008-287989 A | 11/2008 |
| JP | 2009-059681 A | 3/2009 |
| JP | 2010-533953 A | 10/2010 |
| JP | 2010-533954 A | 10/2010 |
| JP | 3168282 U | 5/2011 |
| KR | 10-2005-0026162 A | 3/2005 |
| KR | 10-2008-0063525 A | 7/2008 |
| KR | 10-2009-0031444 | 3/2009 |
| WO | WO 2007/107037 A1 | 9/2007 |
| WO | WO 2007/142428 A1 | 12/2007 |
| WO | WO 2009/011539 A2 | 1/2009 |
| WO | WO 2010/124635 A1 | 11/2010 |

OTHER PUBLICATIONS

European Office Action dated Mar. 8, 2012 for European Patent Application No. EP 10 251 581.4 corresponding to U.S. Appl. No. 12/870,595, filed Aug. 27, 2010, which is related to captioned U.S. Appl. No. 12/870,662.

Office Action dated Jul. 16, 2012 for U.S. Appl. No. 12/870,595, filed Aug. 27, 2010, which is related to captioned U.S. Appl. No. 12/870,662.

Office Action dated Dec. 31, 2012 for U.S. Appl. No. 12/870,595, filed Aug. 27, 2010, which is related to captioned U.S. Appl. No. 12/870,662.

Chinese Office Action dated Nov. 21, 2012 for Chinese Patent Application No. CN 201010284166.2 which claims priority of U.S. Appl. No. 61/241,288, filed Sep. 10, 2009; and U.S. Appl. No. 12/870,595, filed Aug. 27, 2010, which is related to captioned U.S. Appl. No. 12/870,662.

Chinese Office Action dated Apr. 24, 2013 for Chinese Patent Application No. 201010284166.2 which claims priority from U.S. Appl. No. 61/241,288, filed Sep. 10, 2009; and U.S. Appl. No. 12/870,595, filed Aug. 27, 2010, which is related to captioned U.S. Appl. No. 12/870,662.

Office Action dated May 14, 2013 for U.S. Appl. No. 12/870,595, filed Aug. 27, 2010, which is related to captioned U.S. Appl. No. 12/870,662.

* cited by examiner

RECHARGEABLE BATTERY

RELATED APPLICATIONS

This application claims priority to and the benefit of U.S. provisional patent application No. 61/256,023 filed on Oct. 29, 2010 in the U.S. Patent and Trademark Office, the entire contents of which are incorporated herein by reference.

This application relates to U.S. patent application Ser. No. 12/870,595 filed on Aug. 27, 2010, which is incorporated herein by reference in their entirety.

BACKGROUND OF THE INVENTION (a) Field of the Invention

The present invention relates to a rechargeable battery. More particularly, the present invention relates to a high-capacity rechargeable battery.

(b) Description of the Related Technology

A rechargeable battery can be charged and discharged, unlike a primary (non-rechargeable) battery.

SUMMARY OF CERTAIN INVENTIVE ASPECTS

One aspect of the present invention is a rechargeable battery having advantages of solving a safety problem of a high-capacity electrode group, reducing a circuit device and parts that connect cells, preventing cell swelling, and preventing leaning of an electrolyte solution.

Another aspect is a rechargeable battery including a plurality of electrode groups that are housed within a can and that are coupled in parallel, and a spacer that is interposed between the electrode groups to spatially separate neighboring electrode groups. Another aspect is a rechargeable battery, comprising: a current collecting plate; a plurality of electrode assemblies electrically connected substantially in parallel with each other via the current collecting plate, wherein each of the electrode assemblies comprises two opposing ends and an outer side formed between the two ends, and wherein the current collecting plate is electrically connected to one of the two ends of the electrode assemblies; a spacer; and a can configured to accommodate i) the current collecting plate, ii) the plurality of electrode assemblies and iii) the spacer, wherein the spacer is positioned i) between adjacent electrode assemblies and/or ii) between an inner surface of the can and at least one of the electrode assemblies, and wherein the spacer comprises at least one non-linear portion which contacts the outer side of at least one of the electrode assemblies.

In the above battery, each of the electrode assemblies has a cylindrical shape. In the above battery, the at least one non-linear portion of the spacer is curved so as to receive the outer side of the at least one electrode assembly. In the above battery, the curvature of the non-linear portion of the spacer is substantially similar to that of the outer side of the at least one electrode assembly. In the above battery, the spacer comprises a plurality of first sub-spacers and a plurality of second sub-spacers, wherein each of the first sub-spacers comprises two opposing concave portions in which the outer sides of two adjacent electrode assemblies substantially fit, and wherein each of the second sub-spacers comprises i) a concave portion in which the outer side of at least one of the electrode assemblies substantially fits and ii) a linear portion which contacts an inner surface of the can.

In the above battery, at least one penetration hole is defined in the concave portions of each of the first sub-spacers, and wherein the at least one penetration hole forms a flow passage of an electrolyte solution into the adjacent electrode assemblies. In the above battery, the spacer has an integral structure which is substantially similar in shape to that of the can, wherein the spacer comprises a bottom, a top and a side, wherein the top and bottom are opposing each other, and wherein the side is substantially perpendicular to the top and bottom. In the above battery, a plurality of insertion holes are defined in at least one of the top and bottom, and wherein the spacer is configured to receive the plurality of electrode assemblies via the plurality of insertion holes, respectively. In the above battery, a plurality of heat dissipation holes are defined in the side of the spacer so that at least one of the plurality of electrode assemblies is exposed toward an inner surface of the can.

In the above battery, the spacer and can have a substantially rectangular parallelepiped shape. In the above battery, the spacer and can have a modified rectangular parallelepiped shape, wherein the side of the spacer has at least one curved portion, wherein the can has at least one curved portion corresponding to the side of the spacer, and wherein the curvature of the at least one curved portion of the spacer is substantially similar to that of the curved portion of the can. In the above battery, the electrode assemblies are arranged so as to form a single row inside the can. In the above battery, the electrode assemblies are arranged so as to form a plurality of rows inside the can.

Another aspect is a rechargeable battery, comprising: a plurality of electrode assemblies electrically connected substantially in parallel with each other, wherein each of the electrode assemblies comprises two opposing ends and an outer side formed between the two ends; a spacer; and a can configured to accommodate the plurality of electrode assemblies and the spacer, wherein the spacer is positioned i) between adjacent electrode assemblies and/or ii) between an inner surface of the can and at least one of the electrode assemblies, and wherein the spacer comprises a plurality of concave portions in which the outer sides of the electrode assemblies substantially fit.

In the above battery, the spacer has a plurality of sub-spacers which are separated from each other, and wherein each of the plurality of sub-spacers comprises at least one concave portion which contacts the outer side of at least one of the electrode assemblies. In the above battery, the spacer has an integral structure which is substantially similar in shape to that of the can, wherein a plurality of insertion holes are defined in the spacer, and wherein the spacer is configured to receive the plurality of electrode assemblies via the plurality of insertion holes, respectively.

The above battery further comprises: an additional current collecting plate; a plurality of electrode assemblies electrically connected substantially in parallel with each other via the two current collecting plates, wherein each of the electrode assemblies comprises two opposing ends and an outer side formed between the two ends, and wherein the first and second current collecting plates are electrically connected to the two ends of the electrode assemblies; a spacer; a can configured to accommodate i) the first and second current collecting plates, ii) the plurality of electrode assemblies and iii) the spacer; and a cap plate configured to close one end of the can, wherein one of the two current collecting plates is directly connected to the other end of the can, wherein the spacer is positioned i) between neighboring electrode assemblies and/or ii) between an inner surface of the can and at least one of the electrode assemblies, and wherein the spacer comprises at least one non-linear portion which contacts the outer side of at least one of the electrode assemblies.

In the above battery, the spacer is formed of a synthetic resin. In the above battery, the electrode assemblies are arranged so as to form a single row inside the can.

In the above battery, the electrode assemblies are arranged so as to form a plurality of rows inside the can.

DETAILED DESCRIPTION OF CERTAIN INVENTIVE EMBODIMENTS

Figure 1:
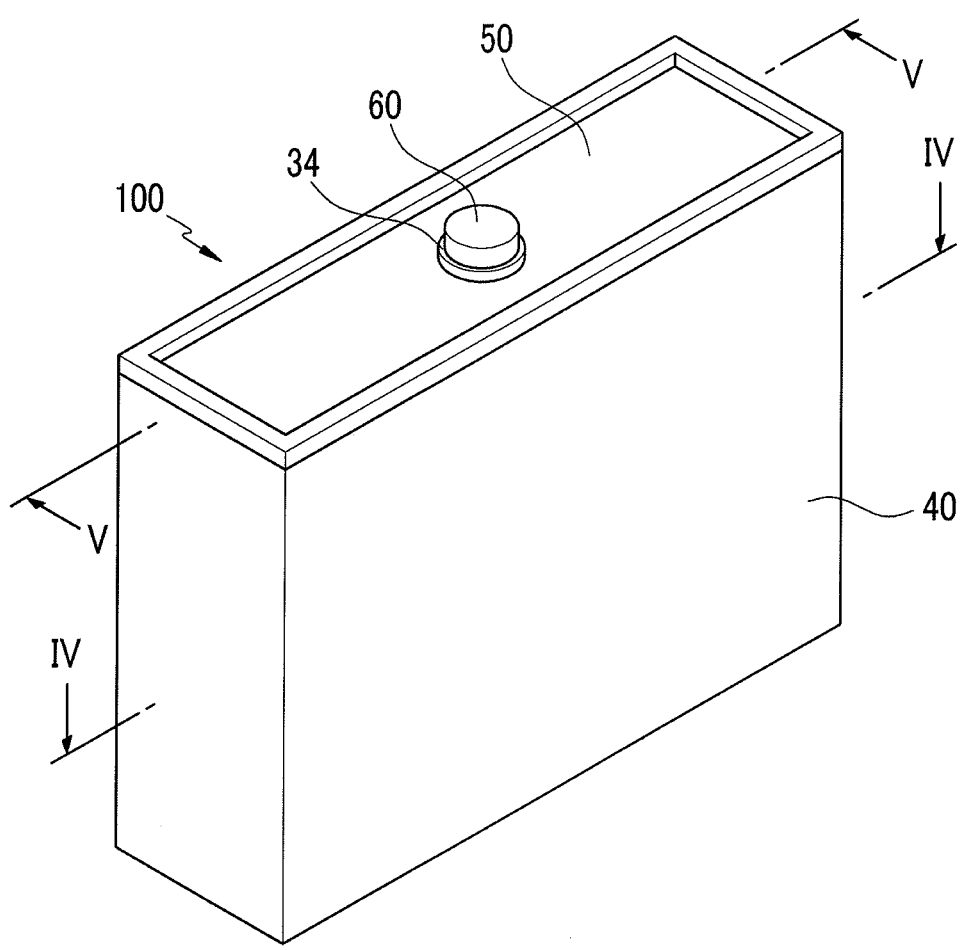
FIG. 1 is a perspective view of a rechargeable battery according to a first exemplary embodiment of the present invention.

A large cylindrical cell can satisfy the need of a high-capacity battery. In a rechargeable battery having the same capacity, it is advantageous to use a single large cylindrical cell rather than several smaller cylindrical cells, since it can reduce the number of circuits and components that interconnect batteries.

However, the large cylindrical cell may cause various problems. For example, in order to manufacture a high-capacity rechargeable battery by spiral-winding an electrode group in a jelly roll form, a more number of spiral winds is required compared to that of a low-capacity rechargeable battery.

As the number of spiral winds increases in the electrode group, by increasing a width difference between a positive electrode and a negative electrode, the safety of a cylindrical cell can improve. However, the increase of a width difference between the positive electrode and the negative electrode generally reduces the capacity of the rechargeable battery. Further, in a large cylindrical cell, because an electrode group has high-capacity, an explosion force of the cylindrical cell increases, which may render the battery less safe.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
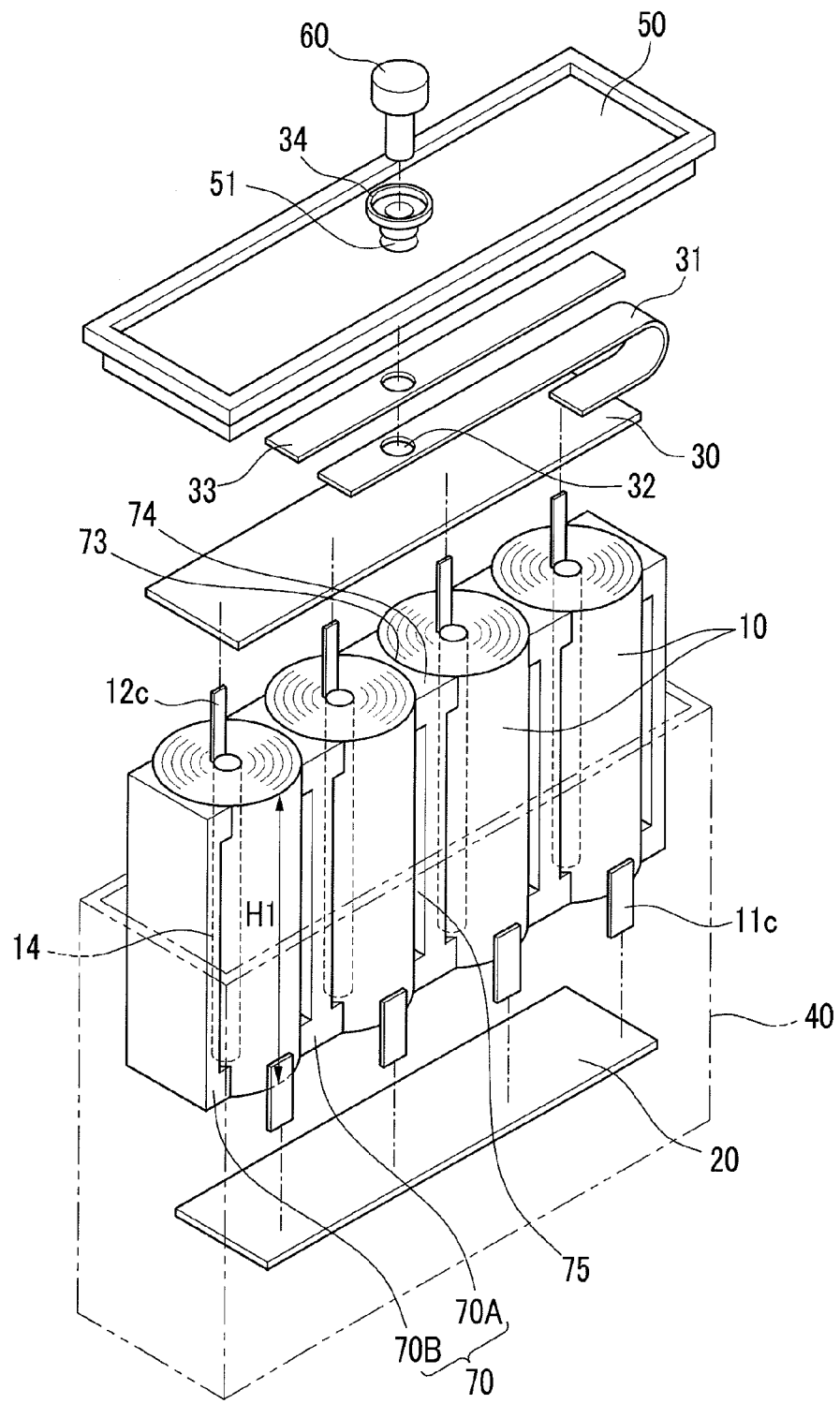
FIG. 2 is an exploded perspective view of the rechargeable battery of FIG. 1.

FIG. 1 is a perspective view of a rechargeable battery according to a first exemplary embodiment of the present invention, and FIG. 2 is an exploded perspective view of the rechargeable battery of FIG. 1. Referring to FIGS. 1 and 2, a rechargeable battery 100 includes a plurality of electrode groups 10, a first current collecting plate 20 (hereinafter, interchangeably used with a "lower current collecting plate"), a second current collecting plate 30 (hereinafter, interchangeably used with an "upper current collecting plate"), a can 40, a cap plate 50, an electrode terminal 60, and a spacer 70.

The rechargeable battery 100 houses a plurality of electrode groups 10 within the can 40. In one embodiment, because the rechargeable battery 100 couples a plurality of low-capacity electrode groups 10 substantially in parallel, the rechargeable battery 100 can sustain safety without increasing the risk of explosion while providing a high-capacity battery.

Figure 3:
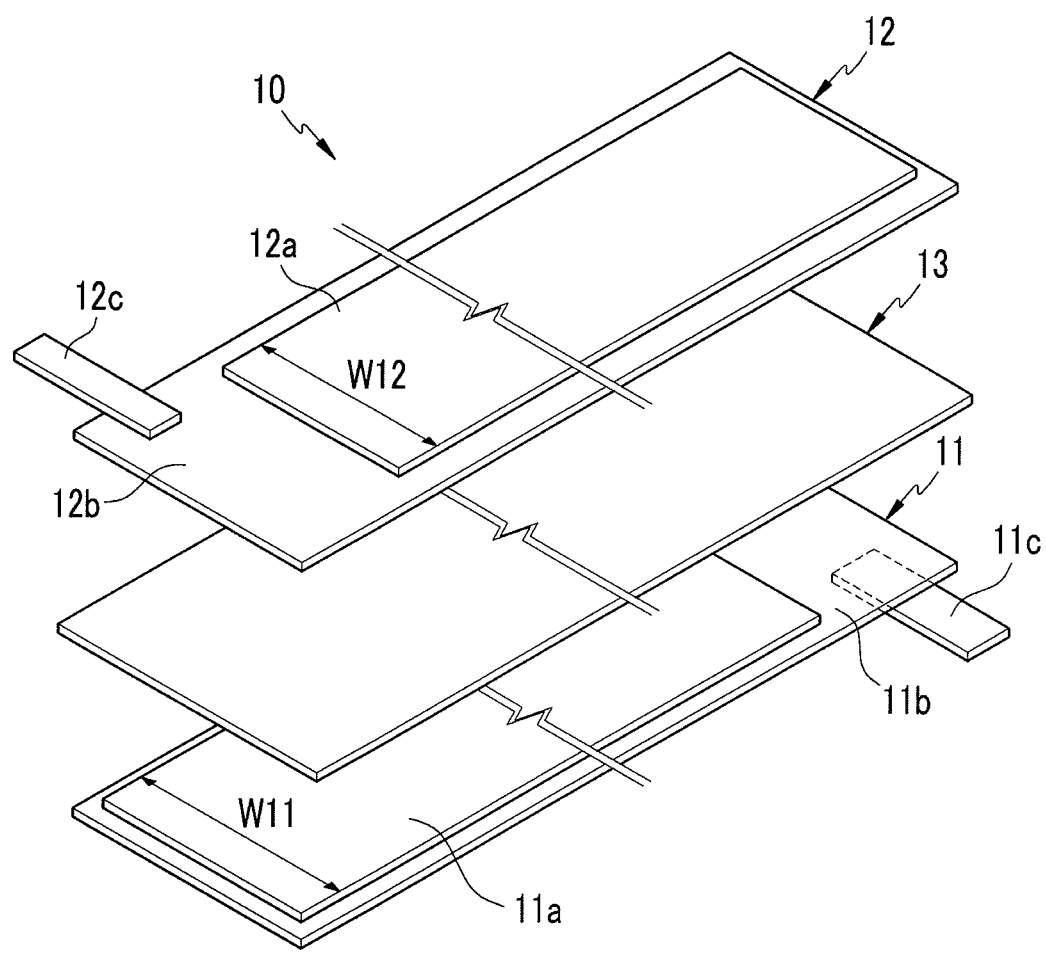
FIG. 3 is an exploded perspective view of an electrode group.
Figure 4:
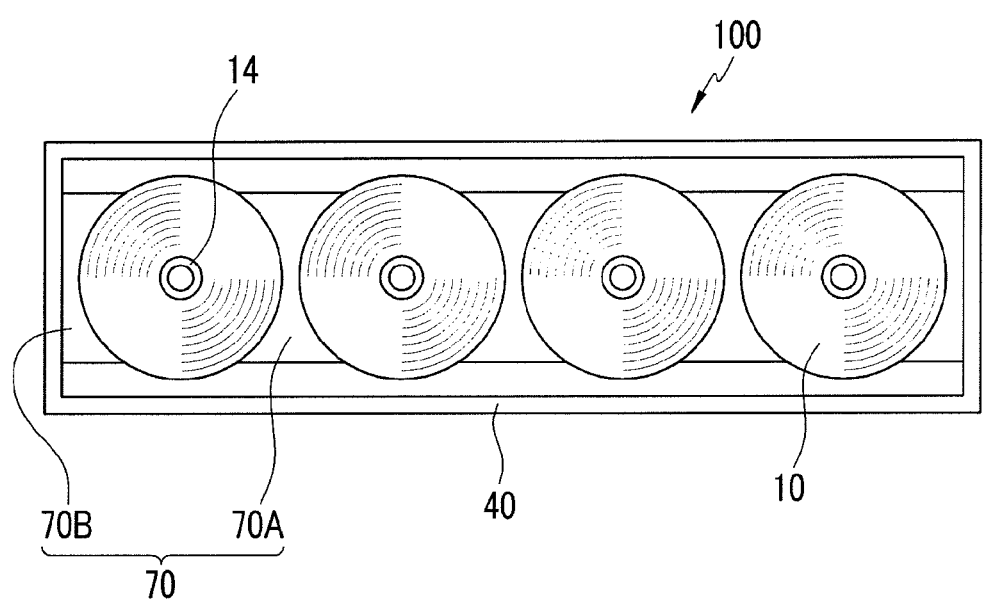
FIG. 4 is a cross-sectional view of the rechargeable battery taken along line IV-IV of FIG. 1.

FIG. 3 is an exploded perspective view of an electrode group, and FIG. 4 is a cross-sectional view of the rechargeable battery taken along line IV-IV of FIG. 1. Referring to FIGS. 3 and 4, the electrode group 10 is formed in a jelly roll form by spiral-winding together a negative electrode 11, a positive electrode 12, and a separator 13. The separator 13 is interposed between the negative electrode 11 and positive electrode 12, and insulates the two electrodes 11 and 12 from each other.

In one embodiment, the electrode group 10 is formed in a cylindrical shape. A sector pin 14 is disposed at the center of the cylindrical electrode group 10, and the sector pin 14 sustains a cylindrical shape of the electrode group 10 (see FIG. 4).

In one embodiment, the negative electrode 11 and the positive electrode 12 form a current collector with a thin plate metal foil and include coating regions 11a and 12a, respectively, in which an active material is coated in the current collector. In one embodiment, the negative electrode 11 and the positive electrode 12 include uncoated regions 11b and 12b, respectively, in which an active material is not coated in the current collector. That is, the uncoated regions 11b and 12b are formed at opposite ends of the coating regions 11a and 12a, respectively.

A first lead tab 11c (hereinafter, interchangeably used with a "negative electrode lead tab") is connected to the uncoated region 11b of the negative electrode 11. A second lead tab 12c (hereinafter, interchangeably used with a "positive electrode lead tab") is connected to the uncoated region 12b of the positive electrode 12.

In one embodiment, the negative electrode lead tab 11c protrudes from an outer surface of the electrode group 10 to one side (e.g., lower side), and the positive electrode lead tab 12c protrudes from the center of the electrode group 10 to an opposite side (e.g., upper side) of the negative electrode lead tab 11c (see FIG. 2).

In one embodiment, because a plurality of electrode groups 10 are disposed within the can 40, the electrode groups 10 are formed in a cylinder shape of a volume that is smaller than the entire internal space of the can 40. Therefore, as the number of spiral winds of the electrode groups 10 is reduced, a width difference W11–W12 between the negative electrode 11 and the positive electrode 12 for sustaining safety of the rechargeable battery 100 can be minimized. This can prevent reduction in capacity of the rechargeable battery 100. The safety of the rechargeable battery 100 can be enhanced, if the coating region 12a of the positive electrode 12 and the coating region 11a of the negative electrode 11 are not short-circuited. In one embodiment, for this purpose, a width W12 of the coating region 12a of the positive electrode 12 is formed smaller than a width W11 of the coating region 11a of the negative electrode 11 (W12<W11). Since the number of spiral winds of the electrode group 10 is reduced, a width difference W11−W12 to sustain the safety of the rechargeable battery 100 can be minimized.

Figure 5:
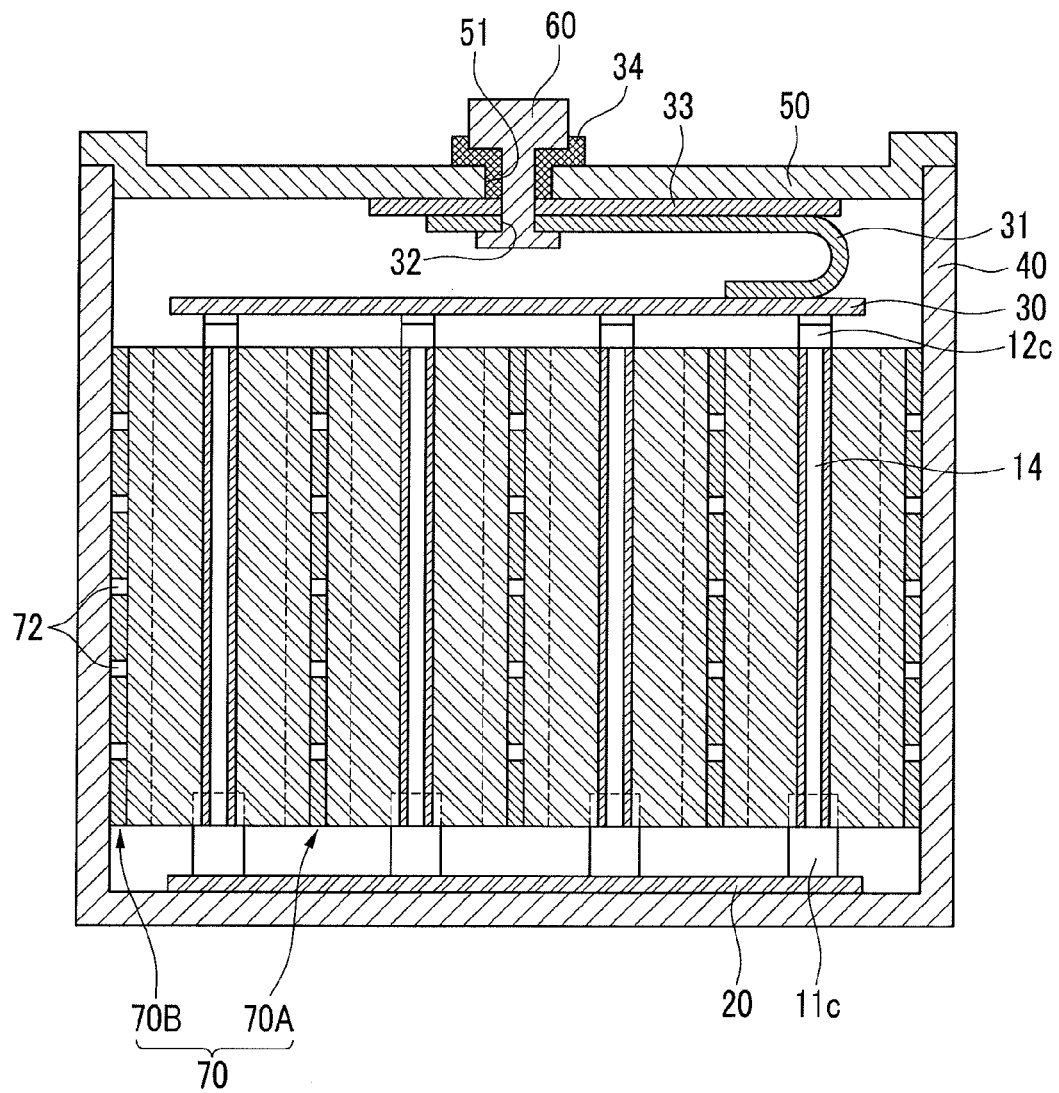
FIG. 5 is a cross-sectional view of the rechargeable battery taken along line V-V of FIG. 1.

FIG. 5 is a cross-sectional view of the rechargeable battery taken along line V-V of FIG. 1. Referring to FIG. 5, in each of the electrode groups 10, the negative electrode lead tabs 11c protrude to a lower part of the electrode groups 10 to be connected, for example, by welding to the lower current collecting plate 20 that is disposed at the lower part of the electrode groups 10.

The positive electrode lead tabs 12c protrude to an upper part of the electrode groups 10 to be connected, for example, by welding to the upper current collecting plate 30 that is disposed at an upper part of the electrode groups 10. That is, a plurality of electrode groups 10 are coupled substantially in parallel by the lower current collecting plate 20 and the upper current collecting plate 30 to provide a high-capacity battery.

In one embodiment, the can 40 is formed in a substantially rectangular parallelepiped shape having one side opened to accommodate the plurality of electrode groups 10. Because the can 40 can contain a plurality of low-capacity of cylindrical electrode groups 10, a high-capacity rechargeable battery 100 can be embodied. Therefore, when connecting the plurality of rechargeable batteries 100, the number of parts or circuits that interconnect the batteries can be reduced and cell swelling can be prevented.

In one embodiment, the spacer 70 is interposed between the electrode groups 10 that are coupled in substantially parallel to spatially separate the neighboring electrode groups 10. Further, when inserting the electrode groups 10, or in a state where the electrode groups 10 are inserted into the can 40, the spacer 70 fixes the electrode groups 10. In one embodiment, a spacer 70 is provided at the outermost part of a row of the electrode groups 10 to spatially separate the electrode groups 10 and the can 40 and more securely fix the electrode groups 10 in a state where the electrode groups 10 are inserted into the can 40.

Figure 6:
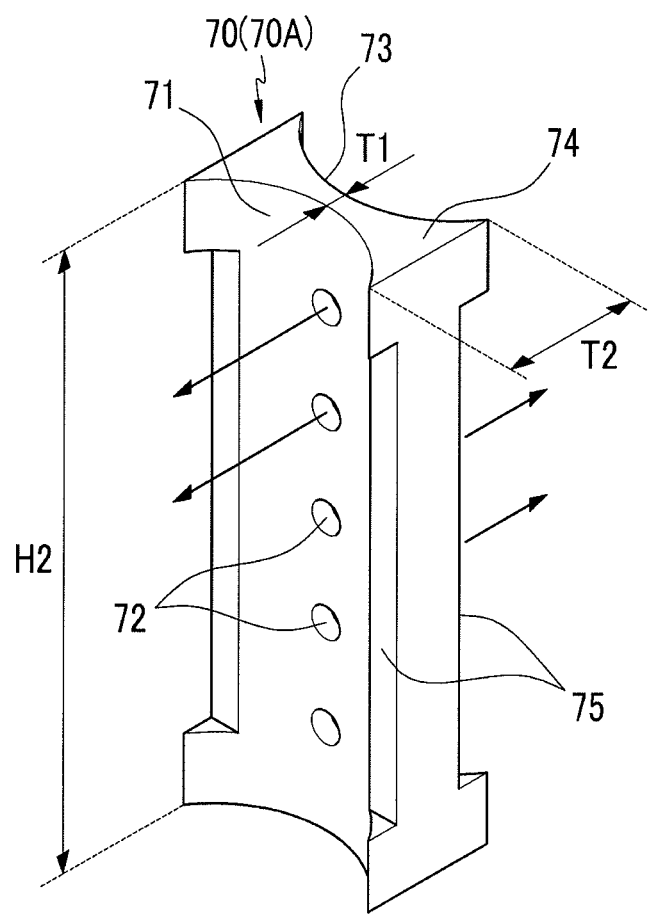
FIG. 6 is a perspective view of a spacer that is applied to the first exemplary embodiment.

FIG. 6 is a perspective view of a spacer that is applied to the first exemplary embodiment. Referring to FIG. 6, the spacer 70 includes a curved portion 71 having a height H2. In one embodiment, at least part of the curved portion 71 contacts the electrode groups 10, having a height H1 (see FIG. 2). Further, the at least part of the curved portion 71 may support a cylindrical outer surface of the electrode groups 10 by occupying the space between neighboring cylindrical electrode groups 10. In the first exemplary embodiment, the height H1 of the electrode groups 10 and the height H2 of the spacer 70 are the same. In another embodiment, the height H2 of the spacer is greater than the height H1 of the electrode groups 10. A first spacer 70A, disposed between neighboring electrode groups 10 among the spacers 70, has the curved portion 71 at both surfaces (see FIGS. 4 and 6). A second spacer 70B, disposed between an inner side surface of the can 40 and the outermost electrode group 10, has the curved portion 71 at one surface and has the other one surface that is formed in a plane corresponding to an inner side surface of the can 40 (see FIGS. 2 and 4).

The spacer 70 has penetration holes 72 that are formed in the height H2 direction of the curved portion 71. The penetration holes 72 may or may not be evenly spaced apart from each other. A single penetration hole may be formed in a lower part of the spacer 70, but as shown in FIG. 6, a plurality of penetration holes 72 may be formed. The penetration holes 72 form a flow passage of an electrolyte solution in both sides of the electrode groups 10 that are partitioned by the spacer 70 within the can 40. Therefore, the spacer 70 guides a flow of an electrolyte solution between the electrode groups 10, thereby preventing an electrolyte solution from leaning to one side between the electrode groups 10 and allowing the leaned electrolyte solution to form substantially the same electrolyte solution level.

In one embodiment, the spacer 70 includes i) a central portion 73 of the curved portion 71 which has a first thickness T1 and ii) an outer portion 74 of the curved portion 71 which has a second thickness T2 that is larger than the first thickness T1 in a row direction of the electrode groups 10.

Because the spacer 70 is interposed between the neighboring electrode groups 10, the spacer 70 may intercept heat dissipation of the electrode groups 10. In one embodiment, the spacer 70 is configured to minimize heat dissipation interception of the electrode groups 10. In one embodiment, in order to increase heat dissipation of the electrode groups 10, the spacer 70 includes a heat dissipating portion 75 having an outer portion 74 that is partially cut away. The heat dissipating portion 75 minimizes interception of an outer surface of the electrode groups 10 by the spacer 70 and increases exposure of an outer surface.

In the first exemplary embodiment, the heat dissipating portion 75 is formed in a substantially straight line in the height H2 direction of the spacer 70, but a structure of the heat dissipating portion 75 is not limited thereto. For example, the heat dissipating portion 75 can be formed in various structures such as in a curved line and with protrusions and depressions to increase exposure of an outer surface of the electrode groups 10 (not shown).

Further, because the heat dissipating portion 75 is formed at the center of the height H2 direction of the outer portion 74, the heat dissipating portion 75 supports the electrode groups 10 by both ends of the height H2 direction of the outer wall portion 74, thereby improving the heat dissipation performance, while sufficiently supporting the electrode groups 10.

The spacer 70 can be formed of a synthetic resin having excellent formability, workability, electric insulating property, and thermal resistance. For example, the spacer 70 may be formed of a resin such as polypropylene (PP), polyethylene (PE), polyethyleneterephthalate (PET), and polyimide (PI).

In one embodiment, the rechargeable battery 100 is manufactured as follows. Depending on the embodiment, additional states may be added, others removed, or the order of the states may change. When the electrode groups 10 are inserted into the can 40, by interposing the first spacer 70A between the electrode groups 10 and providing the second spacer 70B at the outermost part of a row of the electrode groups 10, the electrode groups 10 are inserted together with the first and second spacers 70A and 70B.

In a state when the electrode groups 10 and the spacer 70 are inserted into the can 40, the can 40 is connected, for example, by welding to the lower current collecting plate 20. As in the first exemplary embodiment, when the negative electrode lead tab 11c is connected to the lower current collecting plate 20, the can 40, connected to the lower current collecting plate 20, functions as a negative electrode terminal in the rechargeable battery 100. Further, in the electrode groups 10, when the positive electrode lead tab is connected to the lower current collecting plate, the can, connected to the lower current collecting plate, functions as a positive electrode terminal in the rechargeable battery (not shown).

The can 40 can be formed of iron or an aluminum-based conductive metal. As in the first exemplary embodiment, when the can 40 is connected to the negative electrode 11 of the electrode groups 10 to function as a negative electrode terminal, the can 40 can be formed of iron. Further, when the can is connected to the positive electrode of the electrode groups to function as a positive electrode terminal, the can be formed of an aluminum-based metal having conductivity higher than iron (not shown).

The cap plate 50 is coupled to an opened side of the can 40 through which the electrode groups 10 and the spacers 70 are inserted to close and seal the can 40 that houses the electrode groups 10 and an electrolyte solution.

The electrode terminal 60 is installed in the cap plate 50 to be connected to the positive electrode 12 of the electrode groups 10 within the can 40. The electrode terminal 60 is connected to the upper current collecting plate 30 through a connection member 31.

For example, one end of the connection member 31 is connected by welding to the upper current collecting plate 30 and by forming a penetration hole 32 in the other one end thereof, and the connection member 31 is electrically connected to the electrode terminal 60. That is, the electrode terminal 60 is electrically connected to the positive electrodes 12 of the electrode groups 10 through the connection member 31 and the upper current collecting plate 30.

Further, the cap plate 50 is electrically connected to the negative electrode 11 of the electrode groups 10 through the can 40. Therefore, the connection member 31 and the electrode terminal 60 that are electrically connected to the positive electrode 12 have a structure that is electrically insulated from the cap plate 50.

For example, a lower insulator 33 is interposed between the cap plate 50 and the connection member 31 to be electrically insulated from the connection member 31 and the cap plate 50. An upper insulator 34 is interposed between an upper surface of the cap plate 50 and the electrode terminal 60 and between an electrode terminal hole 51 of the cap plate 50 and the electrode terminal 60. The upper insulator 34 electrically insulates the cap plate 50 from the electrode terminal 60, and electrically insulates the electrode terminal hole 51 from the electrode terminal 60.

Hereinafter, various exemplary embodiments of the present invention will be described. In comparing the following exemplary embodiments with the first exemplary embodiment, identical constituent elements will be omitted, and only dissimilar constituent elements will be described hereinafter in detail.

Figure 7:
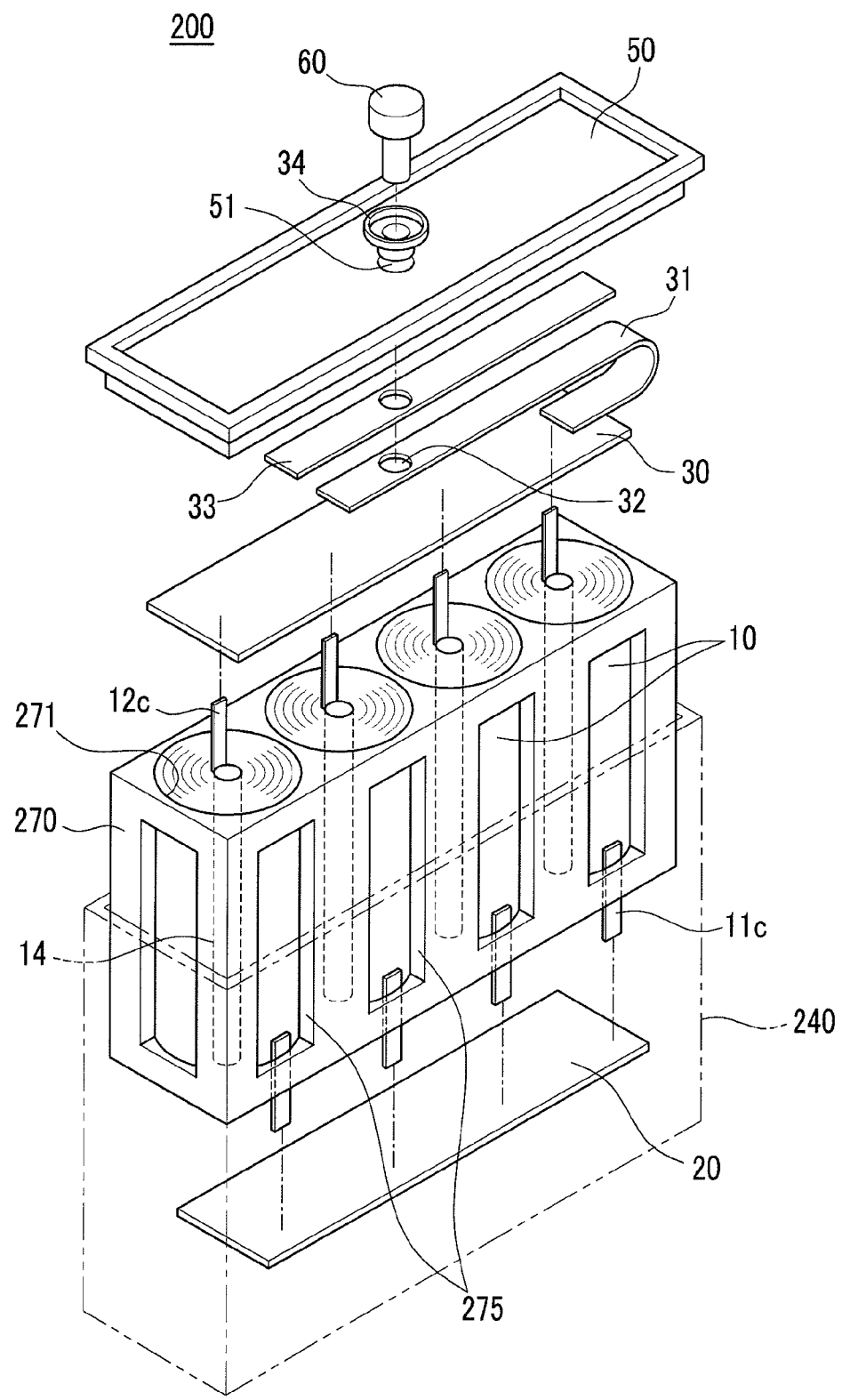
FIG. 7 is an exploded perspective view of a rechargeable battery according to a second exemplary embodiment of the present invention.

FIG. 7 is an exploded perspective view of a rechargeable battery according to a second exemplary embodiment of the present invention. The rechargeable battery 100 of the first exemplary embodiment illustrates the spacer 70 that is independently provided between the electrode groups 10. Alternatively, a rechargeable battery 200 of the second exemplary embodiment illustrates a spacer 270 that is interposed between the electrode groups 10 and that is connected at the outer side of the electrode groups 10 to form an integral structure.

Referring to FIG. 7, in the second exemplary embodiment, the spacer 270 has a substantially rectangular parallelepiped shape corresponding to a can 240 to be inserted into the can 240, and has an insertion hole 271 that is penetrated in an insertion direction (a vertical direction in FIG. 7) of the electrode groups 10 to accommodate the electrode groups 10.

In one embodiment, the rechargeable battery 100 is manufactured as follows. Depending on the embodiment, additional states may be added, others removed, or the order of the states may change. In a state where each of the electrode groups 10 is inserted into the insertion holes 271 of the integral spacer 270, the spacer 270 and the electrode groups 10 are inserted into the can 240. The spacer 270 of the second exemplary embodiment is integrally formed in a column direction of the electrode groups 10 to spatially separate the can 240 and the electrode groups 10, and securely fixes the electrode groups 10 when inserting the electrode groups 10 into the can 240, or in a state where the electrode groups 10 are inserted into the can 240.

Because the spacer 270 houses the electrode groups 10, the spacer 270 may disturb heat dissipation of the electrode groups 10. In one embodiment, the spacer 270 forms a heat dissipation hole 275 in which a side surface of a direction substantially orthogonal to a column direction is partially cut away to increase heat dissipation of the electrode groups 10. The heat dissipation hole 275 minimizes interception of an outer surface of the electrode groups 10 by the spacer 270, thereby increasing exposure of an outer surface of the electrode groups 10.

Figure 8:
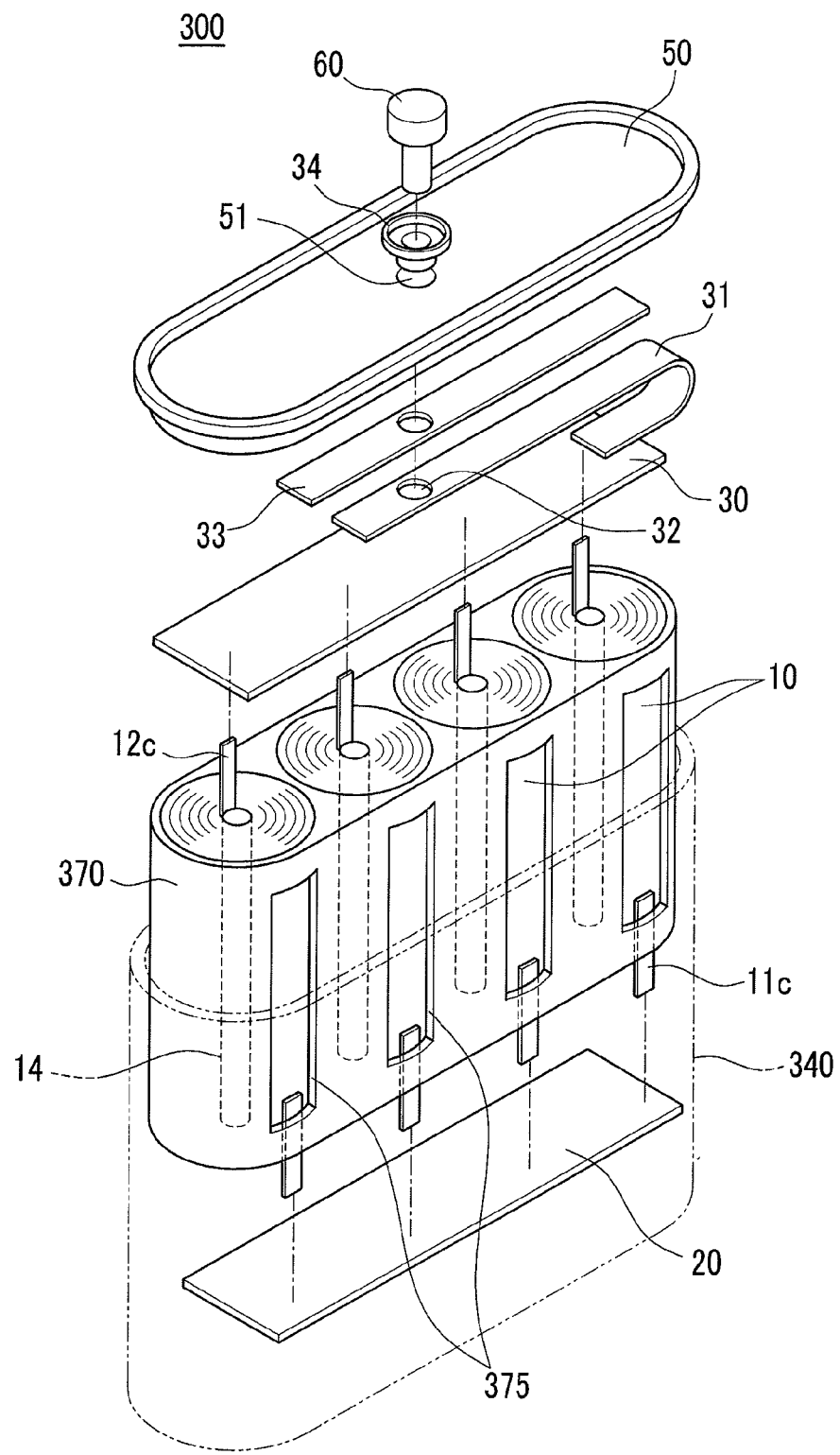
FIG. 8 is an exploded perspective view of a rechargeable battery according to a third exemplary embodiment of the present invention.

FIG. 8 is an exploded perspective view of a rechargeable battery according to a third exemplary embodiment of the present invention. The rechargeable battery 200 of the second exemplary embodiment forms the can 240 and the spacer 270 in a substantially rectangular parallelepiped shape. Alternatively, a rechargeable battery 300 of the third exemplary embodiment forms a can 340 and a spacer 370 in a modified rectangular parallelepiped shape.

As shown in the third exemplary embodiment, by forming both ends of a column direction of the electrode groups 10 in a curved surface corresponding to an external shape of the electrode groups 10, the can 340 and the spacer 370 have a modified rectangular parallelepiped shape.

The can 340 and the spacer 370 in which both ends of a column direction are formed in a curved surface form the rechargeable battery 300 in a modified rectangular parallelepiped shape. The rechargeable battery 300 of the third exemplary embodiment can have a volume smaller than that of the rechargeable batteries 100 and 200 of the first and second exemplary embodiments.

Figure 9:
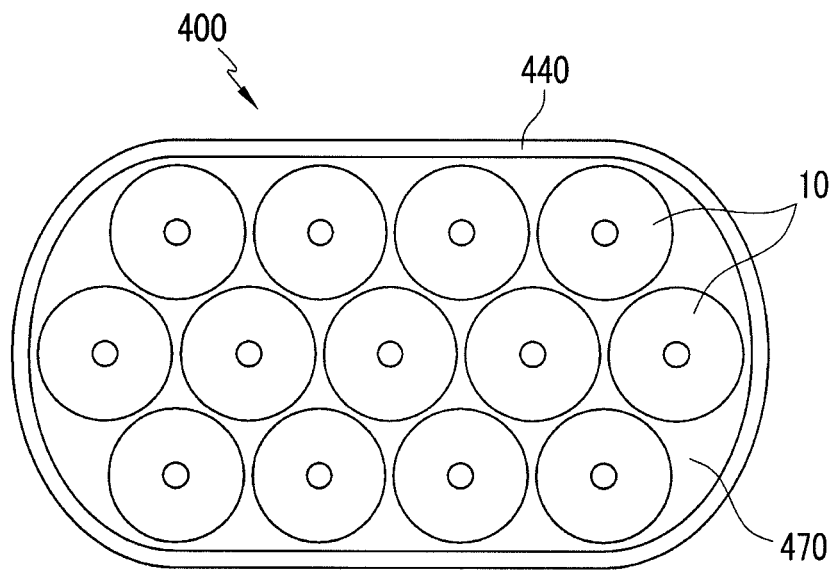
FIG. 9 is a cross-sectional view of a rechargeable battery according to a fourth exemplary embodiment of the present invention.

Further, the spacer 370 forms a heat dissipation hole 375 in which a side surface of a direction substantially orthogonal to a column direction is partially cut away to increase heat dissipation of the electrode groups 10. The heat dissipation hole 375 minimizes interception of an outer surface of the electrode groups 10 by the spacer 370, thereby increasing exposure of an outer surface of the electrode groups 10. FIG. 9 is a cross-sectional view of a rechargeable battery 400 according to a fourth embodiment. The rechargeable battery 400 includes the electrode groups 10 which are arranged so as to form a plurality of rows. Although three rows of the electrode groups 10 are shown in FIG. 9, more than three or less than three rows can be formed depending on the embodiment. In one embodiment, as shown in FIG. 9, the can 440 and the spacer 470 are formed to have a structure corresponding to the plurality of rows of electrode groups 10. In this embodiment, the can 440 has a modified rectangular parallelepiped shape.

Figure 10:
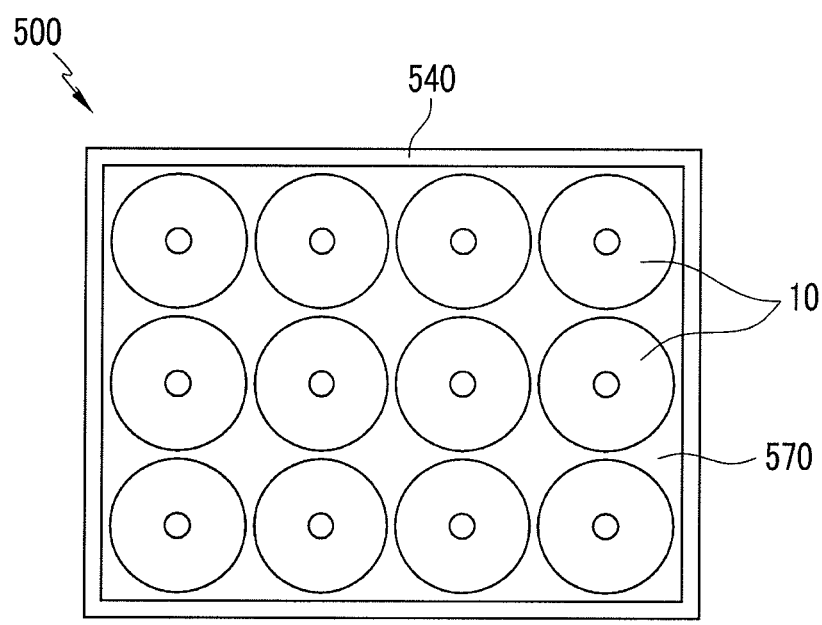
FIG. 10 is a cross-sectional view of a rechargeable battery according to a fifth exemplary embodiment of the present invention.

FIG. 10 is a cross-sectional view of a rechargeable battery 500 according to a fifth embodiment. The rechargeable battery 500 includes the electrode groups 10 which are arranged so as to form a plurality of rows. Although three rows of the electrode groups 10 are shown in FIG. 10, more than three or less than three rows can be formed depending on the embodiment. In one embodiment, as shown in FIG. 10, the can 540 and the spacer 570 are formed to have a structure corresponding to the plurality of rows of electrode groups 10. In this embodiment, the can 540 has a substantially rectangular parallelepiped shape.

According to at least one embodiment, because a plurality of low-capacity cylindrical electrode groups are housed within a can and are coupled substantially in parallel, a width difference between a positive electrode and a negative electrode within the electrode group can be minimized. Thus, a rechargeable battery of a unit cell can provide a high-capacity battery, and the number of circuits and components that interconnect batteries can be reduced. Further, the safety of the electrode group is maintained, and swelling can be prevented, while providing a high-capacity battery.

Moreover, by separating neighboring low-capacity cylindrical electrodes with the use of a spacer interposed between the cylindrical electrode groups, when a cylindrical electrode group is inserted into a can, the cylindrical electrode group is prevented from being shaken. Furthermore, in a state where the electrode group is inserted, the electrode group is securely fixed to the can and leaning phenomenon of an electrolyte solution can be prevented in an internal space of the can.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A rechargeable battery, comprising:
   a current collecting plate;
   a plurality of electrode assemblies electrically connected substantially in parallel with each other via the current collecting plate, wherein each of the electrode assemblies comprises two opposing ends and an outer side formed between the two ends, and wherein the current collecting plate is electrically connected to one of the two ends of the electrode assemblies;
   a spacer; and
   a can configured to accommodate i) the current collecting plate, ii) the plurality of electrode assemblies and iii) the spacer,
   wherein the spacer is positioned at least between adjacent electrode assemblies, wherein the adjacent electrode assemblies and spacer have heights that are measured along a direction in which the electrode assemblies and the spacer are inserted into the can, wherein the height of the spacer is substantially the same as or greater than the height of the electrode assemblies, and wherein the spacer comprises at least one non-linear portion which contacts the outer side of at least one of the electrode assemblies,
   wherein the spacer has an integral one-piece structure which is substantially similar in shape to that of the can, wherein the spacer comprises a bottom, a top and a side, wherein the top and bottom are opposing each other, and wherein the side is substantially perpendicular to the top and bottom.

2. The battery of claim 1, wherein each of the electrode assemblies has a cylindrical shape.

3. The battery of claim 2, wherein the at least one non-linear portion of the spacer is curved so as to receive the outer side of the at least one electrode assembly.

4. The battery of claim 3, wherein the curvature of the non-linear portion of the spacer is substantially similar to that of the outer side of the at least one electrode assembly.

5. The battery of claim 1, wherein the spacer comprises a plurality of first sub-spacers and a plurality of second sub-spacers, wherein each of the first sub-spacers comprises two opposing concave portions in which the outer sides of two adjacent electrode assemblies substantially fit, and wherein each of the second sub-spacers comprises i) a concave portion in which the outer side of at least one of the electrode assemblies substantially fits and ii) a linear portion which contacts an inner surface of the can.

6. The battery of claim 5, wherein at least one penetration hole is defined in the concave portions of each of the first sub-spacers, and wherein the at least one penetration hole forms a flow passage of an electrolyte solution into the adjacent electrode assemblies.

7. The battery of claim 1, wherein a plurality of insertion holes are defined in at least one of the top and bottom, and wherein the spacer is configured to receive the plurality of electrode assemblies via the plurality of insertion holes, respectively.

8. The battery of claim 1, wherein a plurality of heat dissipation holes are defined in the side of the spacer so that at least one of the plurality of electrode assemblies is exposed toward an inner surface of the can.

9. The battery of claim 1, wherein the spacer and can have a substantially rectangular parallelepiped shape.

10. The battery of claim 1, wherein the spacer and can have a modified rectangular parallelepiped shape, wherein the side of the spacer has at least one curved portion, wherein the can has at least one curved portion corresponding to the side of the spacer, and wherein the curvature of the at least one curved portion of the spacer is substantially similar to that of the curved portion of the can.

11. The battery of claim 1, wherein the electrode assemblies are arranged so as to form a single row inside the can.

12. The battery of claim 1, wherein the electrode assemblies are arranged so as to form a plurality of rows inside the can.

13. The battery of claim 1, further comprising:
   an additional current collecting plate, wherein the electrode assemblies are electrically connected substantially in parallel with each other via the two current collecting plates, wherein each of the electrode assemblies comprises two opposing ends and an outer side formed between the two ends, and wherein the current collecting plates are electrically connected to the two ends of the electrode assemblies; and
   a cap plate configured to close one end of the can, wherein one of the two current collecting plates is directly connected to the other end of the can.

14. The battery of claim 1, wherein the spacer is formed of a synthetic resin.

15. The battery of claim 1, wherein the electrode assemblies are arranged so as to form a single row inside the can.

16. The battery of claim 1, wherein the electrode assemblies are arranged so as to form a plurality of rows inside the can.

17. A rechargeable battery, comprising:
   a plurality of electrode assemblies electrically connected substantially in parallel with each other, wherein each of the electrode assemblies comprises two opposing ends and an outer side formed between the two ends;
   a spacer; and
   a can configured to accommodate the plurality of electrode assemblies and the spacer,
   wherein the spacer is positioned at least between adjacent electrode assemblies, wherein the adjacent electrode assemblies and spacer have heights that are measured along a direction in which the electrode assemblies and the spacer are inserted into the can, wherein the height of the spacer is substantially the same as or greater than the height of the electrode assemblies, and wherein the spacer comprises a plurality of concave portions in which the outer sides of the electrode assemblies substantially fit, wherein the spacer has an integral one-piece structure which is substantially similar in shape to that of the can, wherein a plurality of insertion holes are defined in the spacer, and wherein the spacer is configured to receive the plurality of electrode assemblies via the plurality of insertion holes, respectively.

18. The battery of claim 17, wherein the spacer has a plurality of sub-spacers which are separated from each other, and wherein each of the plurality of sub-spacers comprises at least one concave portion which contacts the outer side of at least one of the electrode assemblies.

* * * * *